(12) United States Patent
Van Stralen et al.

(10) Patent No.: US 8,499,585 B2
(45) Date of Patent: Aug. 6, 2013

(54) DEVICE AND METHOD FOR MANUFACTURING AN OPTICAL PREFORM

(75) Inventors: Mattheus Jacobus Nicolaas Van Stralen, Tilburg (NL); Martinus Johannes Marinu Jozeph Swarts, Veldhoven (NL); Igor Milicevic, Helmond (NL); Marco Korsten, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 344 days.

(21) Appl. No.: 12/892,395

(22) Filed: Sep. 28, 2010

(65) Prior Publication Data

US 2011/0023552 A1   Feb. 3, 2011

Related U.S. Application Data

(62) Division of application No. 11/612,936, filed on Dec. 19, 2006, now Pat. No. 7,854,148.

(30) Foreign Application Priority Data

Dec. 22, 2005 (NL) ..................................... 1030749

(51) Int. Cl.
 *C03B 37/018* (2006.01)
(52) U.S. Cl.
 USPC ................. 65/413; 65/418; 65/417

(58) Field of Classification Search
 USPC ........................................... 65/413, 417, 418
 See application file for complete search history.

(56) References Cited

U.S. PATENT DOCUMENTS

| 4,389,229 | A | 6/1983 | Jang et al. |
| 4,826,288 | A | 5/1989 | Mansfield et al. |
| 6,430,967 | B1 | 8/2002 | Mueller |
| 2002/0073739 | A1 | 6/2002 | Zhang et al. |
| 2002/0157423 | A1 | 10/2002 | Soufiane |
| 2002/0162359 | A1* | 11/2002 | Tennent et al. .................. 65/391 |
| 2003/0056548 | A1 | 3/2003 | Sandro et al. |
| 2005/0115277 | A1* | 6/2005 | Kim et al. ....................... 65/417 |

FOREIGN PATENT DOCUMENTS

| JP | 60186428 A * | 9/1985 |
| JP | 2002114534 | 4/2002 |

* cited by examiner

*Primary Examiner* — Queenie Dehghan
(74) *Attorney, Agent, or Firm* — Sughrue Mion, PLLC

(57) ABSTRACT

The present invention relates to a device for manufacturing an optical preform by means of an internal vapor deposition process, said device comprising an energy source and a substrate tube, which substrate tube comprises a supply side for supplying glass-forming precursors and a discharge side for discharging constituents that have not been deposited on the interior of the substrate tube, said energy source being movable along the length of the substrate tube between a point of reversal at the supply side and a point of reversal at the discharge side.

4 Claims, 1 Drawing Sheet

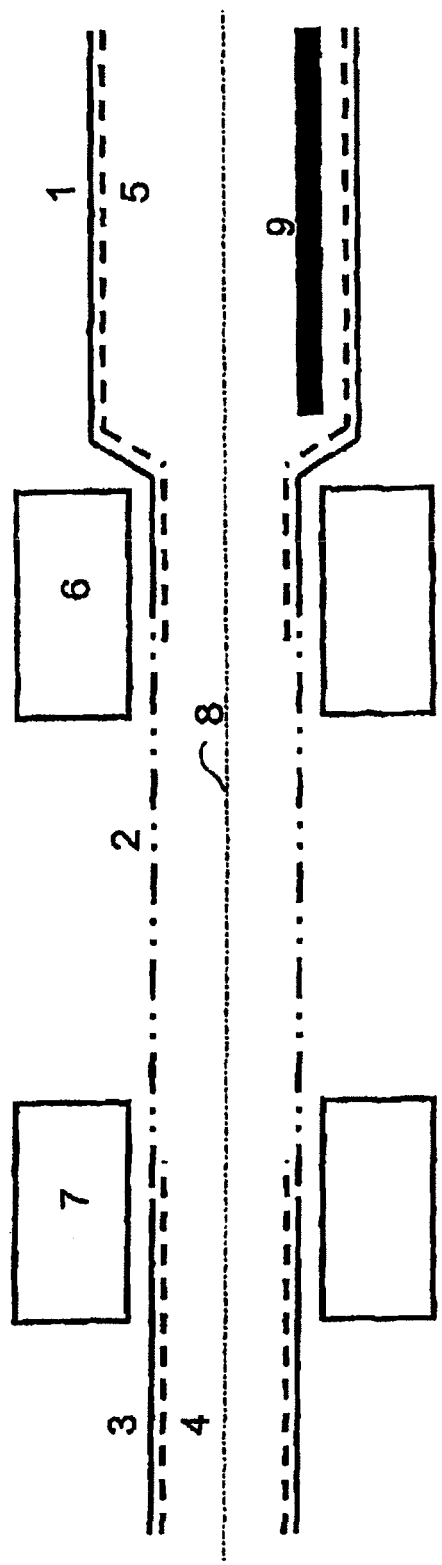

DEVICE AND METHOD FOR MANUFACTURING AN OPTICAL PREFORM

This is a divisional of application Ser. No. 11/612,936 filed Dec. 19, 2006. The entire disclosure of the prior application, application Ser. No. 11/612,936, is considered part of the disclosure of the accompanying divisional application and is hereby incorporated by reference.

BACKGROUND OF THE INVENTION

1. Field of the Invention

The present invention relates to a device and a method for manufacturing an optical preform by means of an internal vapour deposition process, said device comprising an energy source and a substrate tube, which substrate tube comprises a supply side for supplying glass-forming precursors and a discharge side for discharging constituents that have not been deposited on the interior of the substrate tube, said energy source being movable along the length of the substrate tube between a point of reversal at the supply side and a point of reversal at the discharge side.

2. Background

Such a device is known per se from Korean patent application No. 2003-774952. The device that is known therefrom is used for manufacturing an optical preform by means of an MCVD (Modified Chemical Vapour Deposition) process, wherein use is made of a discharge tube and an insertion tube, which discharge tube is attached to the substrate tube. The insertion tube is positioned in the discharge tube and has a diameter that is smaller than that of the discharge tube. Disposed inside the insertion tube is an element for scraping off soot, comprising a bar which rotates in the interior of the insertion tube and which is in contact with the interior thereof. An annular space is present between the insertion tube and the discharge tube, through which annular space gases are passed.

From International application WO 89/02419 a device for manufacturing an optical preform by means of an internal vapour deposition process is known, wherein a tubular portion is mounted to the pump side of a substrate tube for removing solid undeposited particles. Such a device in particular comprises a screw structure that follows the internal surface of the tubular portion, which screw structure comprises an open, rotatable gas conduit wound in the form of a spiral.

During the deposition of glass layers, which may or may not be doped, in the interior of a substrate tube, in particular by means of a PCVD (Plasma Chemical Vapour Deposition) process, layers of low-quality quartz may be deposited, in particular in the area located outside the range of the reciprocating movement of the energy source, viz. the resonator, along the length of the substrate tube. Examples of such low-quality quartz layers include so-called soot rings, for example, but also quartz with a high internal stress level caused by a high dopant content. The present inventors have found that such low-quality quartz may adversely affect the substrate tube, in particular as a result of the formation of gas bubbles at the supply side of the substrate tube upon contraction of the hollow substrate tube into a solid form. In addition to that the present inventors have found that such low-quality quartz may come loose from the substrate tube during the contraction process, which may result in contamination or bubble formation elsewhere in the substrate tube. Another negative aspect is that cracks may occur in the low-quality quartz region, which cracks may propagate in the direction of the centre of the substrate tube, which is undesirable. The present inventors have furthermore found that the low-quality quartz may lead to clogging, as a result of which the pressure may rise to an undesirably high level during the deposition process, which has a negative effect on the deposition process in the substrate tube, which manifests itself in the form of a white colour in practice.

The substrate tube is made of high-quality quartz. In practice the total length of the substrate tube will be longer than the portion of the substrate tube that will eventually be converted into a glass fibre by means of a drawing process, however, because the two ends of the substrate tube, where deposition takes place, may cause undesirable side effects, viz. deposition defects, contamination, bubble formation and the like.

Thus it is an object of the present invention to provide a device for manufacturing an optical preform by means of an internal vapour deposition process wherein the aforesaid problems, which can be attributed mainly to the low quality of the quartz, are eliminated.

Another object of the present invention is to provide a device for manufacturing an optical preform by means of an internal vapour deposition process wherein no bubble formation or other undesirable effects occur during the contraction process, when the hollow substrate tube is converted into a solid preform.

SUMMARY OF THE INVENTION

The present invention as formulated in the introductory paragraph is characterised in that an insertion tube is present in the interior of the substrate tube at the discharge side, wherein the external diameter and the shape of the insertion tube substantially correspond to the internal diameter and the shape of the substrate tube, and wherein the insertion tube extends beyond the substrate tube.

One or more of the above objects are accomplished when using such a device. More in particular, the low-quality quartz will accumulate in an insertion tube that thus is configured, which means that such quartz will be deposited on the interior of the insertion tube, which insertion tube will be removed upon completion of the deposition process. Consequently, no bubbles will form in the glass layers of the substrate tube during the contraction process that is carried out after the deposition process, whilst in addition the formation of cracks in the layers is prevented.

According to preferred embodiment of the present invention, the substrate tube is provided with a discharge tube at the discharge side, which discharge tube is configured to surround the insertion tube with a close fit.

In a special embodiment it is desirable if the insertion tube extends in the direction of the supply side, to a position in the area between the point of reversal at the supply side and the point of reversal at the discharge side, whilst it is furthermore preferable if the discharge tube extends in the direction of the supply side, to a position in the area between the point of reversal at the supply side and the point of reversal at the discharge side.

In the embodiment in which the resonator for generating plasma reverses in the area at the discharge side where the insertion tube and the discharge tube are present, low-quality quartz is deposited on the interior of the insertion tube, which prevents the occurrence of the aforesaid problems during the contraction process. Good results will be obtained in particular if the insertion tube extends further in the direction of the supply side than does the discharge tube, in which case the insertion tube overlaps the welded joint between the substrate tube and the discharge tube, therefore.

To prevent clogging of the passage in the substrate tube, it is desirable that the internal diameter of the discharge tube in the area outside the section between the two points of reversal is larger than the internal diameter of the substrate tube, with the transition from the diameter of the substrate tube to the diameter of the discharge tube taking place gradually.

In a special embodiment not only the discharge side is provided with a discharge tube, but the substrate tube is provided with a supply tube at the supply side as well, wherein the supply tube in particular extends in the direction of the discharge side, in the area between the point of reversal at the supply side and the point of reversal at the discharge side.

In another special embodiment, the supply side is so configured that an insertion tube is disposed inside the supply tube, wherein, in a preferred embodiment, the external diameter and the shape of the insertion tube substantially correspond to the internal diameter and the shape of the supply tube, wherein it is furthermore preferable if the internal diameter of the supply tube is substantially the same as the internal diameter of the substrate tube. It is desirable that the insertion tube at the supply side of the substrate tube extends further in the direction of the discharge side than does the supply tube. The inventors have found that stresses build up in glass layers in the transition area between deposition and no deposition, in particular if dopants are used. As a result of these inflow effects, glass layers may come loose from the interior of the substrate tube in the aforesaid transition area. By having the deposition take place in an insertion tube in said inflow area, the glass layers are prevented from coming loose, or such undesirable effects are at any rate prevented from extending inside the substrate tube.

In a special embodiment it is furthermore desirable that an element for scraping off solid constituents that have not deposited on the interior of the tube in question be present inside the discharge tube, the substrate tube and/or the insertion tube, which element makes contact with the interior of the tube in question. A rotating bar is an element that is suitable for this purpose.

When the present device is used, no crack formation will take place in the deposited layers either during the deposition process or after the deposition process, whilst in addition no bubble formation will take place during the contraction process. When the present device is used, a longer (in time) deposition process will moreover be possible, because the extent to which clogging may occur at the discharge side has been minimised. In addition to that the present inventors have found that no undesirable change will take place as regards the uniformity of the solid preform obtained after contraction, in particular at the supply side of the substrate tube. Using the present device, a substantially full utilisation of the glass material of the substrate tube of a high quality, viz. a maximum utilisation of the length of the substrate tube for drawing optical fibres therefrom, is possible therefore.

The present invention further relates to a method for manufacturing an optical preform by means of an internal vapour deposition process as defined in the appended claims.

BRIEF DESCRIPTION OF THE DRAWINGS

The FIGURE is a schematic view of a device for manufacturing an optical perform according to an embodiment of the present invention.

DETAILED DESCRIPTION OF THE INVENTION

The present invention will be explained hereinafter by means of an example, in which connection it should be noted, however, that the present invention is by no means limited to such a special example.

The FIGURE schematically shows the device according to the present invention. A hollow substrate tube 2 is provided with glass-forming precursors (not shown), with the gas flow taking place from the left to the right, seen in the FIGURE. To effect a deposition of such glass-forming precursors, a resonator 10 for generating a plasma is reciprocated along the length of the substrate tube 2, with the resonator for generating plasma reversing at the discharge side, at the position indicated at 6, and subsequently being moved back in the direction of the supply side along the length of the substrate tube 2, from where it returns to the discharge side again, with the point of reversal at the supply side being schematically indicated at 7. For the sake of completeness it should be noted that the supply of glass-forming precursors takes place at the supply side in the direction of the discharge side. The axis of symmetry of the substrate tube 2 is indicated at 8. A discharge tube 1 is connected to the substrate tube 2 at the discharge side, which discharge tube 1 has a slightly diverging shape, as a result of which the diameter of the discharge tube 1 at the discharge side, beyond the point of reversal 6, is larger than the diameter of the substrate tube 2. Disposed inside the discharge tube 1 is an insertion tube 5, whose external diameter substantially corresponds to the internal diameter of the discharge tube 1. Because of this configuration, no gas flow takes place between the discharge tube 1 and the insertion tube 5. In the embodiment that is shown in the FIGURE, the insertion tube 5 extends in the direction of the supply side, with the insertion tube 5 overlapping the connection between the substrate tube 2 and the discharge tube 1 at the discharge side. Preferably, a quartz bar 9 is present in the interior of the insertion tube 5, which quartz bar is preferably rotatably mounted therein so as to be able to loosen solid constituents that have accumulated on the interior of the insertion tube 5, which solid constituents thus loosened are subsequently discharged from the insertion tube 5 together with the gas flow. The substrate tube 2 is furthermore provided with a supply tube 3 in the supply side area, and an insertion tube 4 is inserted in the interior of the supply tube 3. The external diameter of the insertion tube 4 is substantially the same as the internal diameter of the supply tube 3, so that no gas flows will take place between the supply tube 3 and the insertion tube 4. The point of reversal 7 at the supply side, which is located at a point beyond the length of the substrate tube 2, which means that the resonator 10 for generating plasma will detect the supply tube 3 at the point of reversal at the supply side and then return to the discharge side, with the supply tube 3 blending with the substrate tube 2, and subsequently detect the discharge tube 1 at the discharge side, and then the resonator 10 will return to the point of reversal at the supply side. The insertion tube 4 extends in the direction of the discharge side, preferably the insertion tube 4 will extend further in that direction than does the supply tube 3, so that the insertion tube 4 overlaps the connection between the supply tube 3 and the substrate tube 2. A suitable substrate tube 2 will be a substrate tube of a high-quality quartz, which tube will have a length of about 1.2 m and an external diameter of 34 mm. The supply tube 3 is connected to the substrate tube 2 by means of a welded joint, but it is made of quartz of a lower quality. The insertion tube 4 that is inserted in the supply tube 3 is also made of a low-quality quartz and is a few mm longer than the supply tube 3. A tapered discharge tube 1 is positioned at the discharge side, which discharge tube 1 is connected to the substrate tube 2 via a welded joint and which has an external diameter of 34 mm at the location of the joint. At the other end, the discharge tube 1 has an external diameter of about 45 mm, with the tapered portion of the discharge tube 1 being located beyond the point of reversal 6 of the resonator 10 for generating plasma. The insertion tube 5 is in particular also a few mm longer than the discharge tube 1, with the quartz bar 9 having a length of about 150 mm and an external diameter of 12 mm. During the PCVD process, the resonator 10 is moved over the substrate tube 2 over a distance of about 1.3 m, with the resonator 10 for generating plasma reciprocating between the point of reversal 6 and the point of reversal 7. Upon completion of the PCVD process, the substrate tube 2 is contracted into a solid preform. A solid preform obtained in this manner is provided with one or more additional glass layers on the outside, after which the preform thus obtained is mounted in a drawing tower for obtaining a glass fibre therefrom under heating. The total length of the high-quality glass fibre thus obtained substantially corresponds to the entire central portion of the substrate tube 2, in fact the area that lies between the insertion tube 4 and the insertion tube 5.

The invention claimed is:

1. A method for manufacturing an optical preform by means of an internal vapour deposition process, comprising the following steps:
   supplying glass-forming precursors at a supply side of a substrate tube;
   depositing glass layers in the interior of the substrate tube by using an energy source, which energy source is moved along the length of the substrate tube between a point of reversal at the supply side and a point of reversal at the discharge side; and
   discharging constituents that have not been deposited on the interior of the substrate tube from the interior of the substrate tube at the discharge side thereof,
   wherein an insertion tube is positioned in the interior of the substrate tube, at the discharge side thereof, before the glass-forming precursors are supplied to the interior of the substrate tube, the external diameter and the shape of the insertion tube substantially corresponding to the internal diameter and the shape of the substrate tube and the insertion tube extends outside the substrate tube, wherein any low-quality quartz is deposited on the interior of the insertion tube.

2. A method according to claim 1, wherein the substrate tube is also provided with a discharge tube, which discharge tube is configured to surround the insertion tube with a close fit.

3. A method according to claim 1, further comprising positioning a supply tube in the interior of the substrate tube, at the supply side thereof, before the glass-forming precursors are supplied to the interior of the substrate tube.

4. A method according to claim 3, wherein the supply tube is provided with an insertion tube, wherein the external diameter and the shape of the insertion tube substantially correspond to the internal diameter and the shape of the substrate tube.

* * * * *